United States Patent
Le Dantec et al.

(10) Patent No.: US 6,697,855 B1
(45) Date of Patent: Feb. 24, 2004

(54) ADAPTIVE HYBRID METHOD FOR ACCESS TO A TRANSMISSION CHANNEL

(75) Inventors: Claude Le Dantec, Saint Hilaire des Landes (FR); Pascal Rousseau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/246,171

(22) Filed: Feb. 8, 1999

(30) Foreign Application Priority Data

Feb. 27, 1998 (FR) .................................... 98 02407

(51) Int. Cl.⁷ .................. G06F 9/00; G06F 15/16; G06F 15/173
(52) U.S. Cl. ............. 709/223; 709/104; 709/105; 709/200; 709/201; 709/226
(58) Field of Search .................. 709/200–203, 709/217–219, 223–227, 229, 235, 100, 104; 340/825.08, 825.5, 825.06, 825.07, 825.52; 370/433, 445, 447, 449, 346; 710/109

(56) References Cited

U.S. PATENT DOCUMENTS

| | | | | |
|---|---|---|---|---|
| 4,071,908 A | * | 1/1978 | Brophy et al. ............. 710/46 |
| 5,121,387 A | * | 6/1992 | Gerhardt et al. ........... 370/322 |
| 5,659,787 A | * | 8/1997 | Schieltz ..................... 709/226 |
| 5,793,307 A | * | 8/1998 | Perreault et al. .......... 340/825.5 |
| 5,920,700 A | * | 7/1999 | Gordon et al. ............. 709/226 |
| 5,973,609 A | * | 10/1999 | Schoch ..................... 370/449 |
| 6,006,017 A | * | 12/1999 | Joshi et al. ................ 709/224 |
| 6,114,968 A | * | 9/2000 | Ramakrishnan et al. ... 340/3.51 |
| 6,130,875 A | * | 10/2000 | Doshi et al. ............... 370/225 |

FOREIGN PATENT DOCUMENTS

| | | |
|---|---|---|
| DE | 3613898 | 10/1987 |
| EP | 0773651 | 5/1997 |
| WO | WO 9116775 | 10/1991 |

* cited by examiner

*Primary Examiner*—Majid A. Banankhah
*Assistant Examiner*—Syed J Ali
(74) *Attorney, Agent, or Firm*—Fitzpatrick, Cella, Harper & Scinto (57) ABSTRACT

The invention concerns a method for access to a transmission channel shared between several stations, characterised in that it includes iteratively:

an operation (302) of estimating requirements of each of the stations for access to the transmission channel, an operation of determining groups (303 and 307) of stations taking into account the estimated access requirements of the stations, at least one of the groups of stations being said to be "collective", an operation of allocating (308), to each of the groups, access rights each corresponding to an interval of time during which the stations which do not form part of the group are not authorised to access the transmission channel, and during which, if the group is collective, each station which it includes gains access to the transmission channel according to a contention method.

37 Claims, 5 Drawing Sheets

ADAPTIVE HYBRID METHOD FOR ACCESS TO A TRANSMISSION CHANNEL

BACKGROUND OF THE INVENTION

The present invention concerns an adaptive hybrid method for access to a transmission channel.

A centralised network has a base station (also referred to as the "central station") and mobile stations (also referred to as "peripheral stations") which are supervised by the base stations, that is to say they can access the network only when the base station gives them authorisation to do so, by allocating to them individually or collectively a momentary access right or "token", corresponding to an interval of time during which one or more stations are authorised to send.

Two principal access methods are known. The first, referred to as "polling", consists of successively allocating individual access rights which authorise one of the mobile stations to access the network. The second, referred to as "contention", consists of allocating a right of access simultaneously to all the mobile stations. In this second case, each mobile station is authorised to access the network at any moment, according to procedures which depend only on its internal functioning, and risks of collision arise.

Two performance criteria for the networks which are generally used are on the one hand the maximum total throughput of data circulating therein and on the other hand the mean latency, that is to say the mean period which elapses between the instant when a frame is ready to be sent and the correct and complete reception of this frame.

It will easily be understood that the polling method makes it possible to achieve a very high theoretical total throughput but entails a high latency, whereas the contention method affords low latency but does not allow a very high maximum throughput.

The polling method is in fact best suited to cases where the total throughput required for all transmissions of information between the stations is high, whereas the contention method is most suited to low throughputs relating to an available passband.

The document U.S. Pat. No. 4,071,908 (Bell Telephone Lab) describes a hybrid access method which uses the principle of a progressive subdivision of a group which initially contains all the stations, in making the division account being taken only of the criterion of the total transmission load on the channel. Each division takes place in groups, the composition of which is predetermined by the addresses of the stations, as long as a group replies to a token and includes at least two stations. Thus, in many cases, stations which have only a small requirement for access to the channel are allocated individual access rights, because of the proximity of their address to those of the stations which have a high requirement for access to the channel. Access to the channel is then poorly distributed between the stations.

The document WO 91/16775 presents a hybrid communication system which allocates individual access rights according to the number of collisions which is detected. The groups are, there too, defined by the addresses of the stations. This system has the same drawbacks as the one described in the document U.S. Pat. No. 4,071,908.

The present invention sets out to remedy these drawbacks. In particular, the invention is distinguished by the determination of the requirement of each station for access to the channel and then by the determination of groups according to these access requirements, and then by allocating access rights to the stations in each group, in succession.

It should be noted here that the access requirements are preferentially measured either in proportion to the distributed time intervals, or in proportion to the period of use of the shared channel.

To this end, the present invention relates, according to a first aspect, to a method for access to a transmission channel shared between several stations, characterised in that it includes iteratively:

an operation of estimating requirements of each of the said stations for access to the transmission channel, an operation of determining groups of stations taking into account the estimated access requirement of the said stations, at least one of the said groups of stations being said to be "collective", an operation of allocating, to each of the said groups, access rights each corresponding to an interval of time during which the stations which do not form part of the said group are not authorised to access the transmission channel, and during which, if the said group is collective, each station which it includes gains access to the transmission channel according to a contention method.

It should be noted here that an estimation of the access requirement of a station amounts to defining an estimated access requirement which represents the true access requirement of the said station. For example, in order to make the said estimation, it is possible to take account of the number of accesses already effected by the said station, the number of collisions suffered by the data frames sent by the said station, the number of frames remaining to be sent by the said station or the quality of service required by the said station.

By virtue of these provisions, each station, whose access requirement is first estimated, is associated with a group according to this access requirement. The invention therefore makes it possible to allocate the access rights progressively according to the estimated access requirement of each station.

According to particular characteristics, during the operation of determining groups, at most only one group having more than one station is determined.

This group is referred to as "collective" in distinction to the groups which contain only one station and which are hereinafter called "individual".

By virtue of these provisions, apart from the stations in the said collective group, all the other stations can receive individual rights of access to the transmission channel. In addition the presence of each station in any collective group depends only on their estimated access requirement. Finally, the stations in the said collective group can be allocated collective access rights. The type, individual or collective, of the access rights allocated to a station is then a function of the estimated access requirement of this station.

According to particular characteristics, the access method as briefly disclosed above:

includes an operation of defining a first so-called "stability" threshold applicable to the sum of the estimated access requirements of a group, and during the group determination operation, each group is determined so that no collective group has a sum of access requirements of the stations which it includes which is greater than the said first stability threshold.

Preferentially, the determination of the said first stability threshold takes account of the contention method concerned.

By virtue of these provisions, when collective access rights are given to the stations in the said collective group, the stability of the network can be guaranteed, since the estimation of the access requirements is reliable.

According to particular characteristics, the group determination operation includes:

a so-called "stability" test during which it is determined whether the sum of the estimated access requirements of all the stations is greater than the said first stability threshold, and in the affirmative, an operation of generating at least one individual group each including one and only one of the stations which have an estimated access requirement greater than or equal to the estimated access requirement of each other station.

By virtue of these provisions, when access by contention for all the stations would lead to saturation of the channel, at least two groups are determined, some of which, individual, each have a station amongst those whose estimated access requirement is the highest, and the last, generally collective, includes all the other stations. It is then possible to allocate to the first ones an individual access right and to the last one a collective access right.

According to particular characteristics, conjointly with the implementation of the said generation operation, the group determination operation includes an operation of defining a second so-called "stability" threshold and iteratively:

a so-called "stability" test during which it is determined whether the sum P' of the estimated access requirements of all the stations which are not already in an individual group, relative to the available passband for these stations, is greater than the said second stability threshold S', and in the affirmative, a new operation of generating at least one individual group each including one and one only of the stations which have an estimated access requirement greater than or equal to the estimated access requirement of each other station which is not already in an individual group.

By virtue of these provisions, the individual groups are iteratively constituted so that the stations which remain and which, collectively, do not have a total access requirement which risks saturating the channel, may, conjointly, be allocated a collective access right, whilst the other stations are each allocated an individual group which can receive an individual access right.

According to particular characteristics, during the group determination operation, when a station is in an individual group, each station whose estimated access requirement is strictly greater than the estimated access requirement of the said station, is in an individual group.

By virtue of these provisions, all the stations which have an access requirement which is estimated to be greater than a given value, are in an individual group. Thus it is possible to allocate to each of them an individual access right, whilst the stations which have a lesser requirement for access to the channel are grouped together in a collective group to which collective access rights can be allocated.

According to particular characteristics, during the group determination operation, when a station is in an individual group, each station whose estimated access requirement is greater than or equal to the estimated access requirement of the said station, is in an individual group.

By virtue of these provisions, two stations which have the same estimated access requirement are always in the same situation, either, together, in the collective group, or, each, in an individual group.

According to particular characteristics:

during the access requirement estimation operation, the access requirement of each station is estimated by taking into account at least a number of accesses effected previously by the said station, during the access requirement estimation operation, the access requirement of each station is estimated by taking into account at least one estimation of a number of collisions previously suffered by data frames sent by the said station, and/or during the access requirement estimation operation, the access requirement of each station is estimated by taking into account at least one estimation of a number of accesses remaining to be effected by the said station.

By virtue of each of these provisions, it is easy to estimate access requirements.

It should be noted that, by taking into account several numbers representing for example the accesses effected, the collisions or the accesses remaining to be effected, it is possible to estimate access requirements by taking account of an interpolation of the said numbers.

According to particular characteristics, during the access requirement estimation operation, the access requirement of each station is estimated by taking into account the service quality constraints required for access of the said station.

By virtue of these provisions, the contract on which the service quality is based can be complied with, that is to say it is aimed to guarantee, amongst other things, a latency and a quantity of access per unit time for certain stations.

According to particular characteristics, during the access right allocation operation, there is allocated to each individual group a proportion of all access rights which is an increasing function of the access requirement estimations for the said group.

By virtue of these provisions, the allocation of the access rights is intended to absorb the entire access requirement of each individual group.

According to particular characteristics:

during the access right allocation operation, the total number of access rights allocated is a constant value between the successive access right allocation operations, and/or during the access right allocation operation, the total duration of all the access rights allocated is a constant value.

By virtue of these provisions, the frequency of interrogation of each station is greater than or equal to a predetermined value, which can be useful in the case of isochronous flows, such as those concerning the transmission of speech and/or images, with a quality of service which is simple to implement.

According to a second aspect, which concerns particularly a peripheral station, the present invention relates to a method of access to a transmission channel, for a given station, characterised in that it includes:

an operation of estimating a requirement for access to the said channel for the said station, an operation of receiving access rights, for collective access rights:

an operation of determining a threshold access requirement value, taking into account an item of information representing a threshold access requirement in the said collective access right, a test during which it is determined whether the estimated access requirement is less than the said threshold access requirement, and in the event of a positive result, an access to the said channel according to a contention access method.

According to a third aspect, which concerns more particularly a peripheral station, the present invention relates to a method of access, for a given station, to a transmission channel shared between several stations, characterised in that it includes:

an operation of estimating requirements for access to the transmission channel of each of the said stations, an operation of determining groups of stations each including at least one station, the said operation taking into account the estimated access requirement of the said stations, an operation of receiving access rights for collective access rights:

an operation of determining a threshold access requirement value, taking into account an item of information representing a threshold access requirement in the said collective access right, a test during which it is determined whether the estimated access requirement is less than the said threshold access requirement, and in the event of a positive result, an access to the said channel according to a contention access method.

Since the advantages of the second and third aspects of the invention are the same as those of the first aspect, they are not repeated here.

According to a fourth aspect, the present invention relates to a device for access to a transmission channel shared between several stations, characterised in that it includes processing means adapted to, iteratively:

estimate requirements of each of the said stations for access to the transmission channel, determine groups of stations taking into account the estimated access requirement of the said stations, at least one of the said groups of stations being said to be "collective", allocate, to each of the said groups, access rights each corresponding to an interval of time during which the stations which do not form part of the said group are not authorised to access the transmission channel, and during which, if the said group is collective, each station which it includes gains access to the transmission channel according to a contention method.

According to a fifth aspect, the present invention relates to a device for access to a transmission channel, for a given station, characterised in that it includes processing means adapted to, iteratively:

estimate a requirement for access to the said channel for the said station, receive access rights, for collective access rights:

determine a threshold access requirement value, taking into account an item of information representing a threshold access requirement in the said collective access right, determine whether the estimated access requirement is less than the said threshold access requirement, and in the event of a positive result, and if an access must be effected by the said station, access the said channel according to a contention access method.

According to a sixth aspect, the present invention relates to a device for access, for a given station, to a transmission channel shared between several stations, characterised in that it has processing means adapted to, iteratively:

estimate a requirement for each of the said stations for access to the transmission channel, determine groups of stations each including at least one station, taking into account the estimated access requirement of the said stations, receive access rights, for collective access rights:

determine a threshold access requirement value, taking into account an item of information representing a threshold access requirement in the said collective access right, determine whether the estimated access requirement is less than the said threshold access requirement, and in the event of a positive result, and if an access must be effected by the said station, access the said channel according to a contention access method.

Thus, according to the fifth and sixth aspects of the invention, each peripheral station receives a collective access right which includes an item of information representing a threshold or limit value. In order to determine whether or not this peripheral station is authorised to send, the latter compares its estimated access requirement, which, preferentially, the peripheral station determines in the same way as the central station, with the threshold value. When its estimated access requirement is above the threshold value, the peripheral station is not authorised to send. When its estimated access requirement is below the threshold value, the peripheral station is authorised to send according to a contention access method.

The invention also relates to a transmitter, a network master station, a network base station, a network peripheral station, a telephone, a facsimile machine, a network, notably a wireless network, and a bus, characterised in that they implement the method of the invention as briefly disclosed above. As these devices have the same advantages as the method which they implement, they are not restated here.

BRIEF DESCRIPTION OF DRAWINGS

The invention will be understood more clearly from a reading of the following description, given with reference to the accompanying drawings in which.

DETAILED DESCRIPTION OF THE PREFERRED EMBODIMENT

Figure 1:
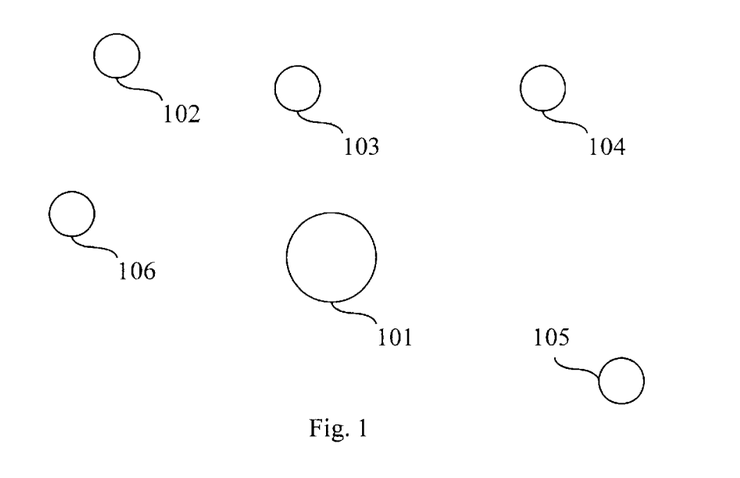
FIG. 1 depicts schematically a centralised local wireless network according to the present invention.

FIG. 1 depicts, in a centralised wireless communication network, a base station 101 and five peripheral stations 102, 103, 104, 105 and 106. Each of the stations can send over a shared transmission channel either in duplex mode, that is to say it is the same transmission medium which serves both for the simultaneous transmissions originating from the base station to the peripheral stations and for the transmissions originating from one of the peripheral stations intended for the base station, or in simplex mode, that is to say the transmission media are different depending on whether the transmission originates from the base station or is intended for it, or in semi-duplex mode, that is to say it is the same transmission medium which serves in alternation for the transmissions originating from the base station to the peripheral stations, and for the transmissions originating from one of the peripheral stations and intended for the base station.

FIGS. 2 to 6 relate to a centralised semi-duplex local wireless network. However, the invention applies equally well to decentralised simplex or duplex networks, to carrier-current networks, to cable networks, to non-local and/or bus networks, using only techniques within the capability of persons skilled in the art of communications.

Figure 5:
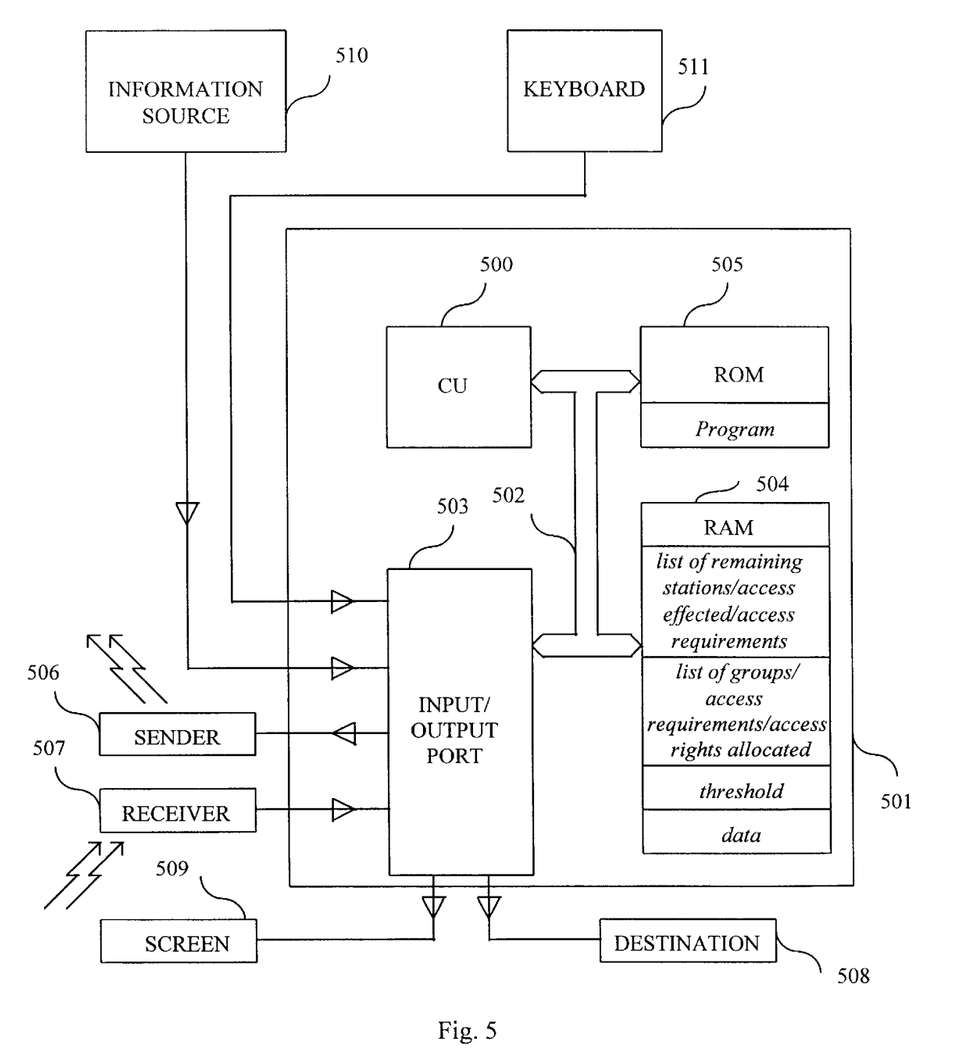
FIG. 5 depicts schematically an electronic device incorporated in the base station illustrated in FIG. 1.
Figure 6:
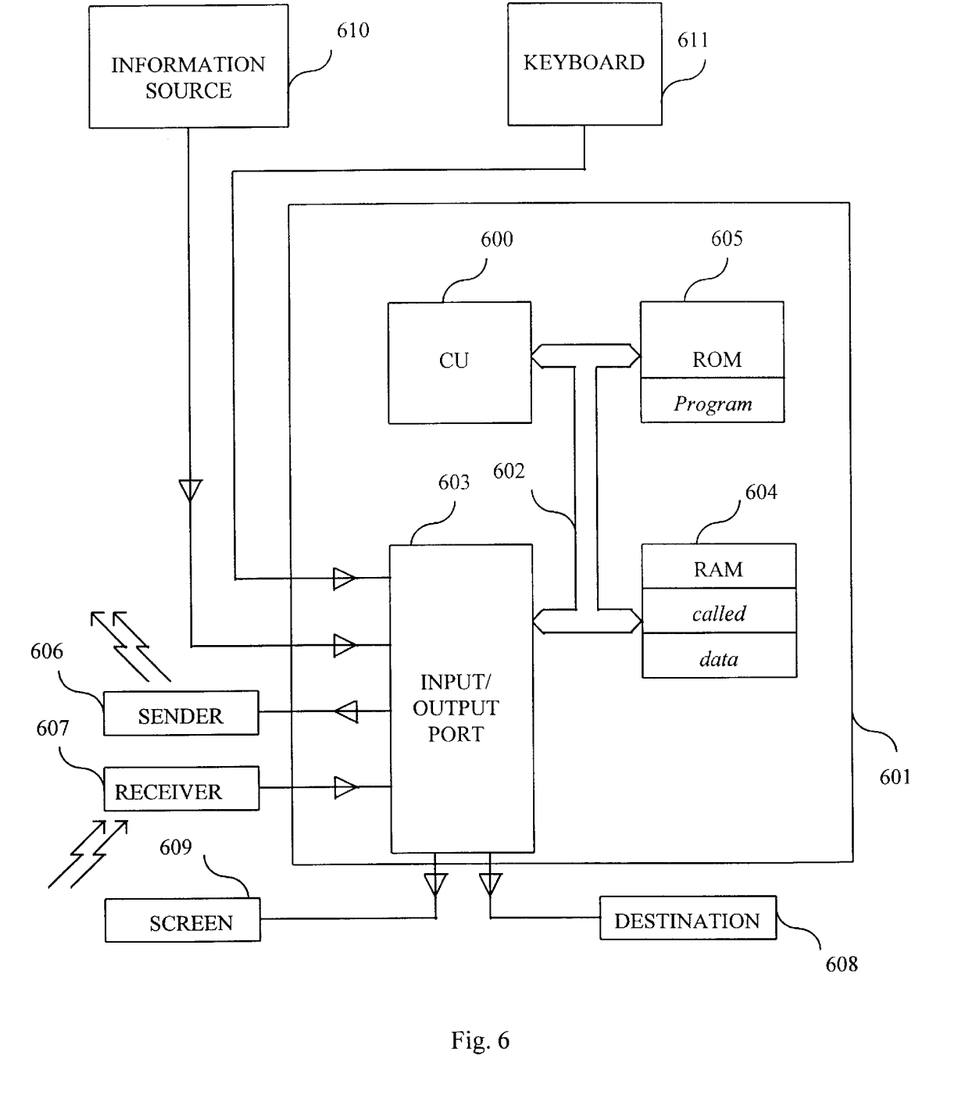
FIG. 6 depicts schematically an electronic device incorporated in a peripheral station illustrated in FIG. 1.

The electronic structure of the central station 101 is partially illustrated in FIG. 5 and that of each of the peripheral stations 102 to 106 is partially illustrated in FIG. 6.

Figure 3:
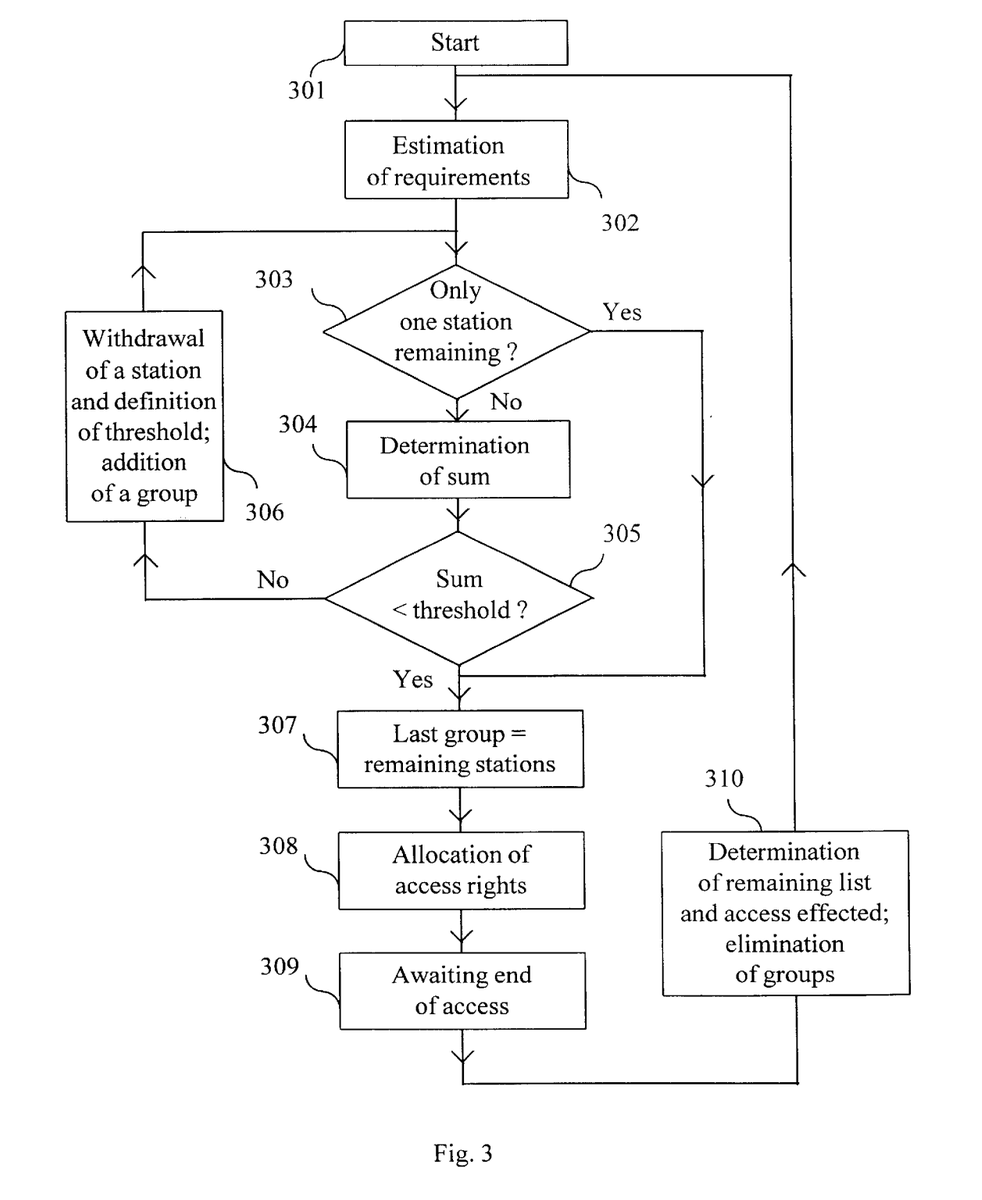
FIG. 3 depicts schematically an operating flow diagram for a base station illustrated in FIG. 1.
Figure 4:
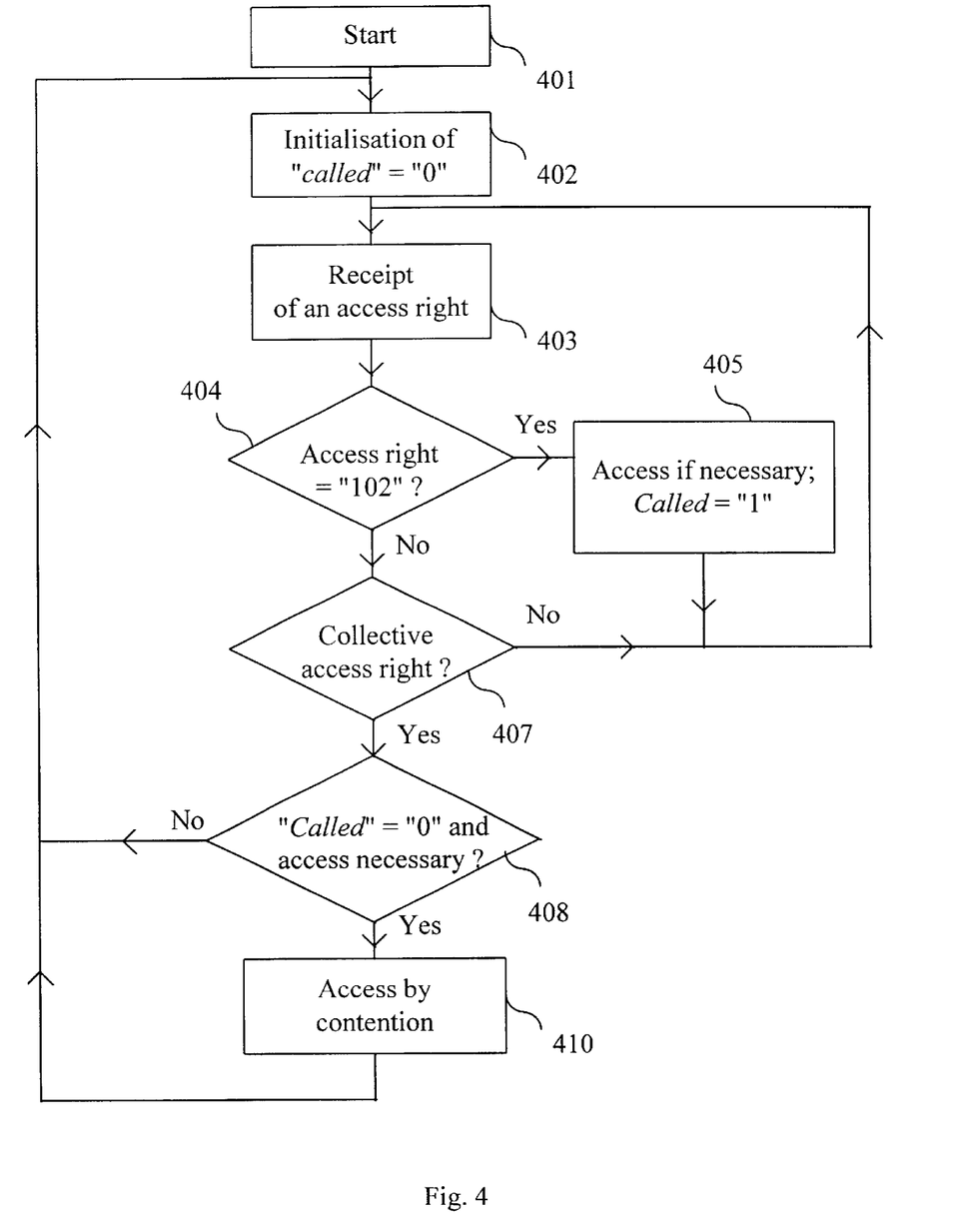
FIG. 4 depicts schematically an operating flow diagram for a peripheral station illustrated in FIG. 1.

The operation of the central station is partially illustrated in FIG. 3 and that of each of the peripheral stations 102 to 106 in FIG. 4.

It will be observed that the actual obtaining, preliminary processing, transmission, reception and delivery of the information by these stations are not detailed in the remainder of the description, since they use only general knowledge of persons skilled in the art of communications. The following description relates to the estimation of access requirements, to the determination of groups of stations and to the distribution of rights of access to the shared transmission channel, between the different stations which make up the network, knowing that the latter is open ended, that is to say new stations can be connected to the network at any time, whilst others can leave it.

In general terms, in addition to the first operating cycle (see operation 302, FIG. 3, below), the present invention consists iteratively, first of all of estimating a requirement for access to the channel for each of the stations, and next distributing the rights of access to the transmission channel by distributing the stations between groups of stations which access the channel either by means of a polling method or by a contention method.

It should be stated here that the access requirements are preferably measured either in proportion to the distributed time intervals or in proportion to the duration of use of the shared channel.

Preferentially, the stations which access the channel by contention are all in the same, collective, group, which contains stations whose estimated access requirement is lesser.

In the embodiment described and depicted here:

for each peripheral station, the estimation of requirement is equal to the sum of the number of accesses actually effected by the peripheral station under consideration during the last operating period of the device, on the one hand, and the number of access awaiting transmission for this peripheral station, on the other hand, and iteratively, it is tested whether all these access requirements can be satisfied by an access according to the contention access method and if so this method is implemented, if not, a station is extracted whose estimated access requirement is maximum, amongst those which remain, and the test is recommenced with the remaining stations, until either the result of a test has been positive or all the peripheral stations except one have been extracted.

Next, each extracted station is allocated a number of individual access rights which is a function of its estimated access requirement, and the remaining stations are allocated access rights by contention.

Figure 2:
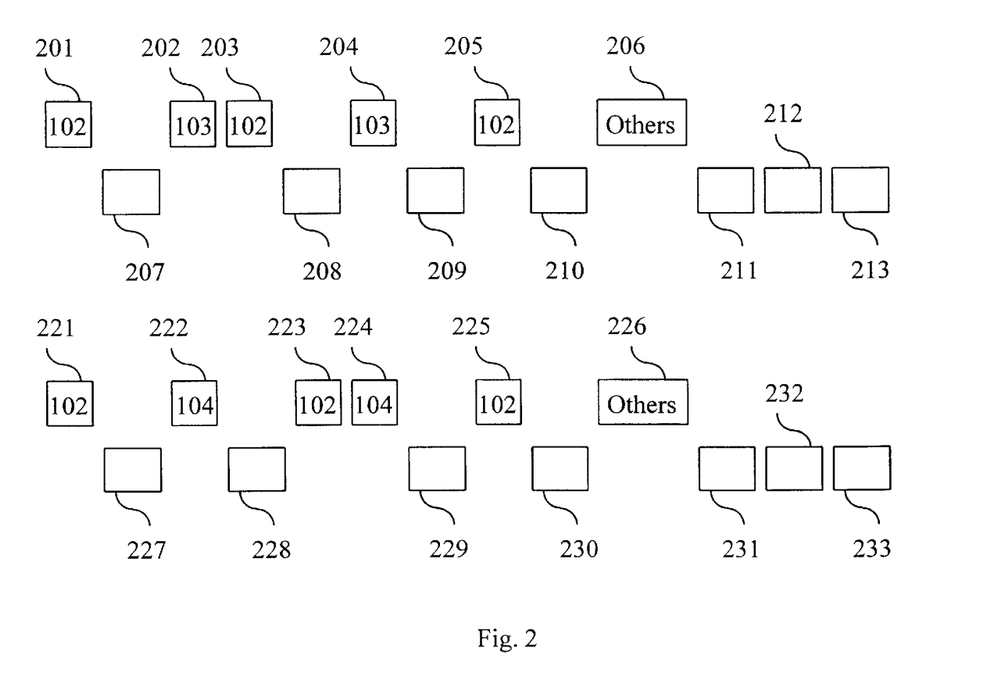
FIG. 2 depicts schematically a succession of access rights and information sequences sent by the stations illustrated in FIG. 1.

FIG. 2 illustrates the distribution of the access rights effected by the base station 101, and the accesses actually effected on four successive lines, which represent, respectively:

the access rights allocated by the base station (numerical references 201 to 206), the accesses actually effected by the peripheral stations (references 207 to 213), in response to these access rights, the access rights allocated by the base station (numerical references 221 to 226), after the period corresponding to the first two lines, and the accesses actually effected by the peripheral stations (references 227 to 233) in response to these access rights.

For each access right, there has been shown, in a rectangle, the numerical reference of the peripheral station which is authorised to access the channel when this authorisation is individual, "others" representing all the peripheral stations which have not obtained, during the period under consideration, an individual access right.

Chronologically, the first two lines represent information transmissions effected during a first period and the last two lines are those which are effected during the following period.

The following exchanges are observed:

an access right 201 is first allocated to the peripheral station 102, the peripheral station 102 uses this access right to effect a transmission 207, indicating that it has no other access to effect, then an access right 202 is allocated to the peripheral station 103, and the station 103 does not use this access right to effect a transmission, then an access right 203 is allocated to the peripheral station 102, and the station 102 uses this access right to effect a transmission 208, indicating that it does not have another access to effect, then an access right 204 is allocated to the peripheral station 103, and the station 103 uses this access right to effect a transmission 209, indicating that it has no other access to effect, then an access right 205 is allocated to the peripheral station 102, and the station 102 uses this access right to effect a transmission 210, indicating that it has no other access to effect, an access right is allocated to all the other peripheral stations (that is to say here the stations 104, 105 and 106), and the station 104 uses this access right to effect a transmission 211, indicating that it has no other access to effect, the station 105 uses this access right to effect a transmission 212, indicating that it has no other access to effect, the station 104 uses this access right to effect a transmission 213, indicating that it has no other access to effect, After this first operating period, the base station 101 estimates the access requirements as follows:

peripheral station 102: 3 units peripheral station 103: 1 unit peripheral station 104: 2 units peripheral station 105: 1 unit peripheral station 106: 0 units The unit is here a fraction of the maximum passband of the network, when the accesses are of predetermined duration (that is to say fixed) or a fraction of the maximum number of access rights.

For the purpose of explanation, there is given below, before the description of FIG. 3, a numerical application making it possible to understand the operating principle at the basis of the present invention. However, for more information on the actual operation of each of the stations, the reader should refer to the parts of the description given with regard to FIGS. 3 to 6.

In this numerical application, it is assumed that the fraction of the maximum number of access rights corresponding to one unit in the following table is equal to 0.05. It is thus possible to determine the passband requirements of each of the peripheral stations, classifying them in decreasing order:

peripheral station 102: 0.15 peripheral station 104: 0.1 peripheral station 103: 0.05 peripheral station 105: 0.05 peripheral station 106: 0

As described below (in particular with regard to FIG. 3), the sum of the access requirements is then produced, denoted "P", which is here equal to 0.35. This value is greater than the stability threshold S (hereinafter referred to as the "first stability threshold") of the contention method used, for example equal to 0.25.

The station which has the highest estimated access requirement is then isolated, the station 102, in an individual group which has an access requirement equal to 0.15 and which, as far as possible, will be allocated the corresponding access rights.

The residual passband available for the collective group which includes the stations 103 to 106 is then equal to 1−0.15=0.85. The sum of the access requirements, denoted "P'", of the remaining stations 103 to 106, on the residual passband, is then equal to 0.2/(1.15)=0.2/0.85 #0.24.

A second stability threshold is then determined, denoted "S'", valid for the collective group, that is to say approximately 0.22 (see the formula below, S'=(1−P)/((1/S)−1)=(1−0.35)/(4−1)#0.22).

As P'>S', the peripheral station is isolated, which, amongst the remaining stations, has the highest estimated access requirement, the station 104, in a second individual group which has an access requirement equal to 0.1.

The residual passband available, for the collective group which includes the stations 103, 105 and 106, is then equal to 1−0.25=0.75. The sum of the access requirements P' of the remaining stations 103 to 106, on the residual passband, is then equal to 0.1/(1−0.25)=0.1/0.75#0.13.

As P'<S', the collective group composed of the stations 103, 105 and 106 and any peripheral stations which could enter the network under consideration is fixed. It is then possible to allocate to this collective group a window for access to the channel corresponding to a proportion equal to 75% of the passband.

The base station 101 then allocates three individual access rights to the station 102, two individual access rights to the station 104 and one collective access right representing 75% of the total passband to the collective group.

By way of example, in the following period, the successive access rights allocated by the base station 101 are successively allocated to:

the peripheral station 102, the peripheral station 104, the peripheral station 102, the peripheral station 104, the peripheral station 102, the "other" peripheral stations, that is to say the peripheral stations 103, 105 and 106 and any peripheral stations which could have entered the network under consideration during the first period.

It will be understood that, at the moment when the base station 101 is started up, all the peripheral stations are allocated an access requirement estimated at nil and consequently are authorised to send according to a contention access method.

Many other examples of access requirement estimation, of distribution between groups of stations and of allocation of access rights are given below.

During its cyclical operation, as illustrated in FIG. 3, the base station 101 first of all initialises its functioning, operation 301:

draws up, in particular, in the random access memory 504 (FIG. 5), a list of so-called "remaining" stations including at least one station, initialises an empty list of groups stored in random access memory 504, and defines a first stability threshold S, taking into account the contention method concerned.

This first stability threshold S relates to a total proportion of the number of distributed time intervals, or a proportion of the duration of use of the shared channel which cannot be exceeded. Here, this first stability threshold S is equal to the theoretical threshold valid for an infinite number of stations and described in the literature relating to the field of contention transmission methods. For example, in the case of the contention method known as "ALOHA", the first stability threshold is fixed at S=0.184; in the case of the contention method known as "slotted ALOHA", the first stability threshold is fixed at S=0.368.

It should be noted here that other contention methods can be used, such as the one known as "CSMA", each of them having a theoretical stability threshold.

In the embodiment described and depicted here, the contention method used is that known as "slotted ALOHA".

For the definition and evaluation of these theoretical thresholds, the reader can refer for example to the book "*Networks: Architecture, Protocols, Applications*" written by Andrew Tannenbaum and published by InterEditions in 1990.

As a variant, the first stability threshold S is determined during each cycle, operations 302 to 310, and depends on the number of stations declared in the network.

Next, the base station 101 performs an access requirement estimation operation, operation 302. To this end, when no operating cycle has yet been performed, it estimates the access requirement of each station at a nil value and, when at least one operating cycle (operations 302 to 310) has been performed, the estimated access requirement of each station is equal to the sum of:

the number of accesses actually effected by the said peripheral station during the last operating cycle, and the number of accesses remaining to be effected by the said station.

In variants which are not shown, the estimated access requirement of each station corresponds:

either to the number of accesses to the channel which it has effected during the given period corresponding to the previous cycle, or to the number of accesses to the channel which it has effected since the previous access requirement estimation operation, or to the number represented by the information inserted during one of the operations 405 or 410, by the peripheral station concerned, and which represents the number of accesses which are still necessary to it, or to an interpolation of one or more of these numbers.

During the operation 302, the list of remaining stations is initialised in order to include all the peripheral stations listed by the central station.

Next, during a test 303, it is determined whether or not, in the list of remaining stations, there remains strictly one station. When the result of the test 303 is positive, the operation 307 is performed. When the result of the test 303 is negative, during an operation 304, the sum of the estimated access requirements of the collective group of remaining stations is determined. By definition, the sum of the estimated access requirements of all the stations is denoted "P" and the sum of the estimated access requirements of the remaining stations is denoted "P'" and is defined relative to a residual passband taking into account the total available passband and the passband allocated to the individual groups.

Next, during a test 305, it is determined whether or not the sum of access requirements of the remaining stations (that is to say P if all the stations are in a collective group or respectively P' if at least one individual group has been defined) is less than the stability threshold under consideration (that is to say the first or respectively the second). When the result of the test 305 is negative, during an operation 306, the central station 101:

records, in the list of groups stored in random access memory 504 (FIG. 5), a new, individual, group including only a single peripheral station taken from the list of remaining stations, whose estimated access requirement is greater than or equal to the estimated access requirement of each other station, and allocates to this group an access requirement equal to that of the station which it contains, withdraws the said station from the list of remaining stations, and solely at the first iteration of the operation 306, determines a new so-called "second" stability threshold which, in the embodiment described and depicted, is equal, to S':

$$S'=(1-P)/[(1/S)-1]$$

where P is the sum of the estimated access requirements of all the stations in the network.

Next, the test 303 is reiterated.

It should be noted here that the inequality applied during the first iteration of the test 305, P<5, is equivalent, for the subset under consideration, to the inequality P'<S' applied to the following iterations. This is because, when P'=P, the writing of the inequality:

$$P'<S'=(1-P)/[(1/S)-1],$$

is then simplified and gives the inequality:

P<S.

When the result of the test 305 is positive, during an operation 307, the central station determines and records in the random access memory 504 (FIG. 5) a collective group of stations which includes all the remaining stations, and allocates to this collective group an estimated requirement equal to the sum of the estimated requirements of the stations which it contains.

It will be noted that, in the embodiment described and depicted here, only one collective group at most is determined, that is to say one including more than one station. In addition, no collective group has a sum of access requirements greater than the stability threshold under consideration.

Next, during an operation 308, the base station 101 allocates access rights to the different groups.

To this end, in the embodiment described and depicted, only two types of access rights are transmitted: first of all individual access rights, which specify the individual group in the form of the address of the station concerned, and then, after all the individual access rights, collective access rights which are intended for all the peripheral stations which have not already received an individual access right, during the current cycle. During the operation 308, the following rules are observed:

to each individual group of stations, a proportion of all access rights which is an increasing function of the estimated access requirement for the said group is allocated, and the total number of access rights allocated is a constant value between the successive access right allocation operations or the total duration of all the access rights allocated is a constant value.

During the operation 308, one of the following rules is also observed:

to each collective group of stations, there is allocated a proportion of the total number of access rights which is equal to the product of the sum of the estimated access requirements of all the stations in the said group on the one hand, and a predetermined factor on the other hand, divided by the sum of the estimated access requirements of all the stations liable to access the channel, or to the sole collective group, there is allocated a number of collective access rights equal to the estimated access requirement of this group, to which there is added a constant, the whole being divided by the first stability threshold concerning the contention method used, and the remaining access rights are allocated in proportion to the estimated access requirements of the individual groups concerned.

Then, during an operation 309, the base station 101 awaits the end of the access authorisation period.

Finally, during an operation 310, the base station 101 determines:

a new list of remaining stations including all the stations which have already sent over the shared transmission channel, associating with them individually the estimation of their requirement, erases the list of groups of stations.

The operation 302 is next reiterated.

It will be noted that there is always a collective group which receives collective access rights, even when it contains only a single known station and even when the estimated access requirement does not meet the stability criterion, so that a station which enters the network can send with the stations of this collective group.

As a variant, and in order to meet a desire for equity between the peripheral stations having the same estimated access requirement, during the operation 306, for each station which is not already in an individual group and which has an estimated access requirement greater than or equal to the estimated access requirement of each other station which is not in an individual group, an individual group is generated which contains only the said station. Consequently, according to this variant, when a station is in an individual group, each station whose estimated access requirement is greater than or equal to the estimated access requirement of the said station, is in an individual group.

According to several variants which are not shown, during the operation 302:
- the access requirement of each station is estimated, taking into account the number of accesses effected previously by the said station, for example, since the start of operation of the network,
- the access requirement of each station is estimated, taking into account the number of accesses effected previously by the said station during a given period, determined either by number of operating cycles, or by duration, or by number of access rights allocated,
- the access requirement of each station is estimated as being equal to an interpolation of the numbers of access rights used by the said station during a given period, according to any interpolation method, and/or
- the access requirement of each station is estimated by taking into account the service quality constraints required for access by the said station. It should be stated here that the service quality is usually based on the concept of a contract made between two communicating means.

According to other variants, during operations 301 and 306:
- the first stability threshold is determined as being the theoretical stability threshold, taking into account the number of remaining stations, and/or
- this first stability threshold is allocated a safety margin, for example by deducting ten percent of this theoretical value.

FIG. 4 illustrates the operation of a peripheral station, here the station 102. After the start of operation 401 of this station 102, during an operation 402, it initialises its random access memory registers 604 (FIG. 6) and, in particular, allocates to a register "called" the value "0", which means that the station concerned has not yet been called in the current cycle.

Next, during an operation 403, the station 102 waits until it receives an access right from the central station 101, this access right being able to be individual, that is to say dedicated to only one of the peripheral stations 102 to 106, or collective, that is to say dedicated to several peripheral stations. In the embodiment described and depicted, only two types of access right are transmitted: individual access rights, which specify the station concerned, and collective access rights which are each intended for all the peripheral stations which have not received an individual access right, during the current cycle.

During a test 404, the peripheral station 102 determines whether or not the access right is an individual access right which designates it. When the result of the test 404 is positive, during an operation 405, the peripheral station 102 stores in the register "called" a value equal to "1", which means that it has already received an individual access right which is dedicated to it during the current cycle. Then the station 102 effects, if it has at least one message to transmit on the transmission channel shared between all the peripheral stations, a transmission on the said channel, inserting, into the information frame sent during the said transmission, an item of information representing the number of access which are still necessary to it. Next, the operation 403 is reiterated.

When the result of the test 404 is negative, during a test 407, the peripheral station 102 determines whether or not the access right received during the operation 403 is a collective access right. When the result of the test 407 is negative, the operation 403 is reiterated.

When the result of the test 404 is positive, a test 408 determines whether or not the register "called" is storing a value "0" and whether or not an access is necessary, for the peripheral station under consideration. When at least one of the results of the test 408 is negative, the operation 402 is reiterated. When the two results of the test 408 are positive, an operation 401 consists of implementing the contention method known as "slotted ALOHA", so that the peripheral station 102 accesses, where applicable, the transmission channel and effects a transmission over the said channel, inserting, into the information frame sent during the said transmission, an item of information representing the number of accesses which are still necessary to it. Next, the operation 402 is reiterated.

According to a variant, not shown:
- with the collective access right, the central station 101 sends, during the operation 308, an item of information representing a so-called "threshold" access right, which is equal to the lowest estimated access right of all the individual groups of stations,
- during the operation 403, each peripheral station receives the access right and, where applicable, the threshold access right information, and
- during the test 408, the peripheral station concerned determines the estimated access requirement which concerns it as determined during the operation 302, by the central station (this requirement is, in the embodiment described and depicted, equal to the number of accesses effected by the peripheral station during the previous cycle), and then determines whether its estimated access requirement is strictly lower than the threshold access requirement received.

The positive and negative results of this test give rise to the same operations as the identical results of the test 408 disclosed with regard to FIG. 4.

FIG. 5 illustrates schematically the constitution of a central station 101, in the form of a block diagram. This station has a keyboard 511, a screen 509, an external information source 510, an external information recipient 508, a radio transmitter 506 and a radio receiver 507, conjointly connected to an input/output port 503 of a processing card 501.

The processing card 501 has, connected together by an address and data bus 502:
- a central processing unit 500;
- a random access memory RAM 504;
- a read only memory ROM 505;
- the input/output port 503.

Each of the elements illustrated in FIG. 5 is well known to persons skilled in the art of microcomputers and transmission systems and, more generally, information processing systems. These common elements are therefore not described here. It should be noted, however, that the information source 510 and the information recipient 508 are, for example, interface peripherals, sensors, modulators, external memories or other information processing systems (not shown).

It should also be noted that the word "register" used in the description designates, in each of the memories, both a memory area of low capacity (a few binary data) and a memory area of large capacity (enabling an entire program to be stored).

The random access memory 504 stores data, variables and intermediate processing results, in memory registers bearing, in the description, the same names as the data whose values they store. The random access memory 504 contains notably:

- a register "list of remaining stations/accesses effected/ estimated individual access requirement" in which the list of so-called "remaining" stations is stored, and, for each station in this list, the number of accesses which it has effected during the previous cycle and the estimation of the access requirement allocated to it,
- a register "lists of groups/estimated collective access requirement/access rights allocated" in which there is stored the list of groups and, for each group, the list of the peripheral stations which it contains, the total access requirement of the stations and the number of access rights allocated to this group,
- a register "threshold" in which there is stored the stability threshold considered during the test 305, and
- a register "data" which stores the data received coming from a peripheral station or from the information source 501 and intended for another peripheral station or for the information recipient 508.

The read only memory 505 is adapted to store the operating program of the central processing unit 500, in a register "program". The central processing unit 500 is adapted to implement the flow diagram described in FIG. 3.

FIG. 6 illustrates schematically the constitution of a peripheral station 102, in the form of a block diagram. This station has a keyboard 611, a screen 609, an external information source 610, an external information recipient 608, a radio transmitter 606 and a radio receiver 607, conjointly connected to an input/output port 603 of a processing card 601.

The processing card 601 has, connected together by an address and data bus 602:

- a central processing unit 600;
- a random access memory RAM 604;
- a read only memory ROM 605;
- the input/output port 603.

Each of the elements illustrated in FIG. 6 is well known to persons skilled in the art of microcomputers and transmission systems and, more generally, information processing systems. These common elements are therefore not described here. It should be noted, however, that the information source 610 and the information recipient 608 are, for example, interface peripherals, sensors, modulators, external memories or other information processing systems (not shown).

The random access memory 604 stores data, variables and intermediate processing results, in memory registers bearing, in the description, the same names as the data whose values they store. The random access memory 604 contains notably:

- a register "called" in which there is stored a binary value representing the reception of an individual access right dedicated to the peripheral station considered since the start of the current operating cycle, and
- a register "data" which stores the data received coming from the central station 101 or, respectively, from the information source 610 and intended for the central station 101 or, respectively, the information recipient 608.

The read only memory 605 is adapted to store the operating program of the central processing unit 600, in a register "program".

The central processing unit 600 is adapted to implement the flow diagram described in FIG. 4.

According to a variant implementation of the present invention, a peripheral station can be in two groups, that is to say can receive on the one hand individual access rights and on the other hand a collective access right. For such peripheral stations, the register "called" is not used.

According to a variant which is not shown, for implementing the invention in combination with service quality constraints, there is allocated to each station whose individual service quality constraints are high, an individual access right, considering that the access requirement of the station is, by itself, greater than the stability threshold under consideration, the other stations obtaining access rights in accordance with the present invention.

The invention is not limited to the embodiments described and depicted but, quite the contrary, extends to any modifications and improvements within the capability of a person skilled in the art.

What is claimed is:

1. An access method for accessing a transmission channel shared between a plurality of stations, said method comprising:
    an estimation operation of estimating access requirements of each of the plurality of stations for access to the transmission channel;
    a group determination operation of determining groups of stations taking into account the estimated access requirements of the plurality of stations, wherein only one of the groups of stations is a collective group;
    a first threshold defining operation of defining a first stability threshold, S, applicable to a sum of estimated access requirements of the collective group, wherein, in said group determination operation, a group is determined such that the collective group has a sum of access requirements of stations included in the group that is not greater than the first stability threshold; and
    an allocation operation of allocating, to each of the groups, access rights respectively corresponding to an interval of time during which stations that are not part of a group are not authorized to access the transmission channel, and during which, if a group is the collective group, each station in that group gains access to the transmission channel according to a contention method.

2. An access method according to claim 1, wherein determination of the first stability threshold, S, takes into account the contention method.

3. An access method according to claim 1, wherein said group determination operation comprises:
    a first stability test for determining whether a sum of estimated access requirements of all of the plurality of stations is greater than the first stability threshold, and,
    if a result of a determination made in the first stability test is affirmative, a generation operation of generating an individual group including only one station that has an estimated access requirement greater than or equal to an estimated access requirement of stations that are not already in an individual group.

4. An access method according to claim 3, wherein, conjointly with said generation operation, said group determination operation includes a second threshold defining operation for defining a second stability threshold and:
    a second stability test for determining whether a sum P' of estimated access requirements of all stations that are not already in an individual group, relative to an available passband for these stations, is greater than a second stability threshold S', and,
    if a result of a determination in the second stability test is affirmative, a second generation operation of generating an individual group that includes only one station that has an estimated access requirement greater than or equal to an estimated access requirement of stations that are not already in an individual group.

5. An access method according to claim 4, wherein the second stability threshold S' is equal to:

$$S'=(1-P)/\{(1/S)-1\}$$

where P is a sum of estimated access requirements of all stations that are able to access the transmission channel and where S is the first stability threshold.

6. An access method according to claim 4, wherein, conjointly with said generation operation, said group determination operation comprises:
   a stability test for determining whether a sum of estimated access requirements of all stations that are not already in an individual group is greater than the second stability threshold, and,
   if a result of a determination in the stability test is affirmative, a second generation operation of generating an individual group that includes a station that has an estimated access requirement greater than or equal to an estimated access requirement of stations that are not already in an individual group.

7. An access method according to claim 1, wherein, in said group determination operation, when a particular station is in an individual group, each station whose estimated access requirement is greater than an estimated access requirement of the particular station is in an individual group.

8. An access method according to claim 1, wherein, in said group determination operation, when a particular station is in an individual group, each station whose estimated access requirement is greater than or equal to an estimated access requirement of the particular station is in an individual group.

9. An access method according to claim 1, wherein, in said estimation operation, an access requirement of a station is estimated by taking into account a number of accesses effected previously by that station.

10. An access method according to any one of claims 1 to 9, wherein, in said estimation operation, an access requirement of a station is estimated by taking into account an estimation of a number of collisions previously suffered by data frames sent by that station.

11. An access method according to claim 1, wherein, in said estimation operation, an access requirement of a station is estimated by taking into account an estimation of a number of accesses remaining to be effected by that station.

12. An access method according to claim 9, wherein, in said estimation operation, an access requirement of a station is estimated by taking into account an interpolation of the number of accesses.

13. An access method according to claim 1, wherein, in said estimation operation, an access requirement of a station is estimated by taking into account service quality constraints required for access of that station.

14. An access method according to claim 1, wherein, in said allocation operation, an individual group is allocated a proportion of all access rights, which are an increasing function of a total number of estimated access requirements for that individual group.

15. An access method according to claim 14, wherein, in said allocation operation, a total number of access rights allocated is a constant value between successive allocation operations.

16. An access method according to claim 14, wherein, in said allocation operation, a total duration of all access rights allocated is a constant value.

17. An access method according to claim 1, wherein, in said allocation operation, the collective group is allocated a proportion of a total number of access rights that is:
   equal to a product of a sum of estimated access requirements of all stations in the collective group and a predetermined factor, in a first case, and
   divided by a sum of estimated access requirements of all stations able to access the transmission channel, in a second case.

18. An access method according to claim 1, further comprising a reception operation of receiving, from a peripheral station, information representing a number of accesses remaining to be effected by the peripheral station, wherein, in said estimation operation, account is taken of the number of accesses remaining to be effected.

19. An access method for a station to access a transmission channel, said method comprising:
   an estimation operation of estimating an access requirement for access to the transmission channel by the station;
   a reception operation of receiving access rights; and,
   in a case of a collective access right:
      a threshold determination operation for determining a threshold access requirement value, taking into account an item of information representing a threshold access requirement in the collective access right,
      a determination test operation for determining whether the estimated access requirement is less than the threshold access requirement, and,
      if a result of said determination test operation is positive, providing access to the transmission channel according to a contention access method.

20. An access method according to claim 19, wherein the determination test operation includes comparing the estimated access requirement with a threshold value received from a central station in said reception operation.

21. An access method for a station to access a transmission channel shared between a plurality of stations, said method comprising:
   an estimation operation of estimating access requirements for access to the transmission channel by each of the plurality of stations;
   a group determination operation of determining groups of stations each of which includes at least one station, said group determination operation taking into account the estimated access requirements of the plurality of stations;
   a reception operation of receiving access rights; and,
   in a case of a collective access right,
      a threshold determination operation for determining a threshold access requirement value, taking into account an item of information representing a threshold access requirement in the collective access right,
      a determination test operation for determining whether an estimated access requirement is less than the threshold access requirement, and,
      if a result of said determination test operation is positive, providing access to the transmission channel according to a contention access method.

22. An access device that provides access to a transmission channel shared between a plurality of stations, said device comprising a processing apparatus adapted to:
   estimate access requirements of each of the plurality of stations to access the transmission channel;

determine groups of stations taking into account the estimated access requirements of the plurality of stations, wherein only one of the groups of stations is a collective group;

calculate a value of a first stability threshold, S, applicable to a sum of estimated access requirements of the collective group;

determine each group such that a sum of access requirements of each station of the collective group is greater than the first stability threshold;

allocate, to a groups, access rights respectively corresponding to an interval of time during which stations that are not part of that group are not authorized to access the transmission channel, and during which, if that group is the collective group, each station included in the collective group gains access to the transmission channel according to a contention method.

23. An access device according to claim 22, wherein the processing apparatus is adapted to estimate an access requirement of a station by taking into account a number of accesses effected previously by that station.

24. A device according to claim 22, wherein the processing apparatus is adapted to allocate, to an individual group, a proportion of all access requirements that is an increasing function of a total number of an estimated access requirement of the individual group.

25. An access device according to claim 22, wherein the processing apparatus is adapted to, in order to determine the groups:

determine whether a sum of the estimated access requirements of all stations is greater than the first stability threshold, S, and, if a determination result is affirmative, generate an individual group that includes only one station that has an estimated access requirement greater than or equal to an estimated access requirement of other stations.

26. An access device according to claim 25, wherein the processing apparatus is adapted to define a second stability threshold S', and:

to determine whether a sum, P', of estimated access requirements of all stations that are not already in an individual group, relative to a passband available for these stations, is greater than the second stability threshold, S', and, if a determination result is affirmative, to generate an individual group that includes only one station that has an estimated access requirement greater than or equal to an estimated access requirement of other station that are not already in an individual group.

27. An access device according to claim 26, wherein the processing apparatus is adapted to implement the second stability threshold, S', defined by:

$$S'=(1-P)/\{(1/S)-1\}$$

where P is a sum of estimated access requirements of all stations that are able to access the transmission channel and where S is the first stability threshold.

28. A sender device comprising an access device according to claim 22.

29. A network master station comprising an access device according to claim 22.

30. A network base station comprising an access device according to claim 22.

31. A network peripheral station comprising an access device according to claim 22.

32. A telephone comprising an access device according to claim 22.

33. A facsimile machine comprising an access device according to claim 22.

34. A network comprising an access device according to claim 22.

35. A bus comprising an access device according to claim 22.

36. An access device that provides a stations with access to a transmission channel, said device comprising a processing apparatus adapted to:

estimate an access requirement for the station to access the transmission channel;

receive access rights; and in a case of a collective access right:
determine a threshold access requirement value, taking into account an item of information representing a threshold access requirement in the collective access right, determine whether the estimated access requirement is less than the threshold access requirement value, and, if a determination result is positive, and if access must be effected by the station, provide access the transmission channel according to a contention access method.

37. An access device for providing a given station with access to a transmission channel shared between a plurality of stations, said device comprising a processing apparatus adapted to:

estimate access requirements for each of the plurality of stations to access the transmission channel;

determine groups of stations each including at least one station, taking into account the estimated access requirements of the plurality of stations;

receive access rights; and, in a case of a collective access right:
determine a threshold access requirement value, taking into account an item of information representing a threshold access requirement in the collective access right, determine whether an estimated access requirement of a station is less than the threshold access requirement value, and, if a determination result is positive, and if access must be effected by the station, provide access to the transmission channel according to a contention access method.

* * * * *

UNITED STATES PATENT AND TRADEMARK OFFICE
CERTIFICATE OF CORRECTION

PATENT NO. : 6,697,855 B1
DATED : February 24, 2004
INVENTOR(S) : Claude Le Dantec et al.

It is certified that error appears in the above-identified patent and that said Letters Patent is hereby corrected as shown below:

Column 9,
Line 41, "0.2/(1.15)" should read -- 0.2/(1-0.15) --

Column 17,
Line 42, "any one of claims 1 to " should read -- claim 1, --.
Line 43, "9," should be deleted.

Column 19,
Line 11, "a groups," should read -- a group, --.
Line 49, "station" should read -- stations --.

Column 20,
Line 17, "stations" should read -- station --.
Line 32, "access" should read -- access to --.

Signed and Sealed this

Thirteenth Day of July, 2004

JON W. DUDAS
*Acting Director of the United States Patent and Trademark Office*